No. 872,261. PATENTED NOV. 26, 1907.
H. SLOTTERBECK.
FREE CASTING REEL.
APPLICATION FILED APR. 13, 1906.

Witnesses:

Inventor:
Harry Slotterbeck
by James R. Townsend
his Atty.

UNITED STATES PATENT OFFICE.

HARRY SLOTTERBECK, OF LOS ANGELES, CALIFORNIA.

FREE-CASTING REEL.

No. 872,261.

Specification of Letters Patent.

Patented Nov. 26, 1907.

Application filed April 13, 1906. Serial No. 311,454.

*To all whom it may concern:*

Be it known that I, HARRY SLOTTERBECK, a citizen of the United States, residing at Los Angeles, in the county of Los Angeles and State of California, have invented a new and useful Free-Casting Reel, of which the following is a specification.

It is of the objects of this invention to provide a fishing reel with improved means whereby the line will unreel freely without interference of the handle whenever it is so desired in order to cast the line; to construct such means of few parts and to adapt them for use with different kinds of reels.

The invention relates to a reel the crank gear of which is shiftable by suitable means so that it can be thrown into and out of mesh with the reel pinion.

An object of this invention is to so construct the same that it may be carried out by any mechanic by applying a simple attachment to an ordinary reel and transforming such reel into a free-casting reel.

Another object is to provide means that will facilitate and make more convenient and agreeable the operation of casting and reeling the lines.

The accompanying drawings illustrate the invention.

Figure 1:
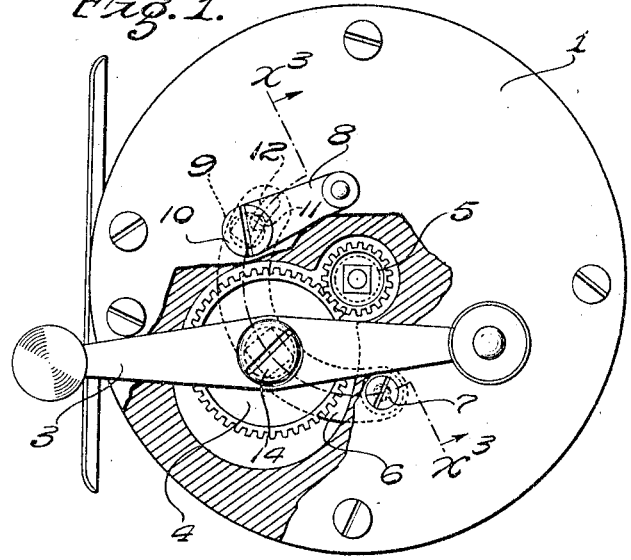
Figure 2:
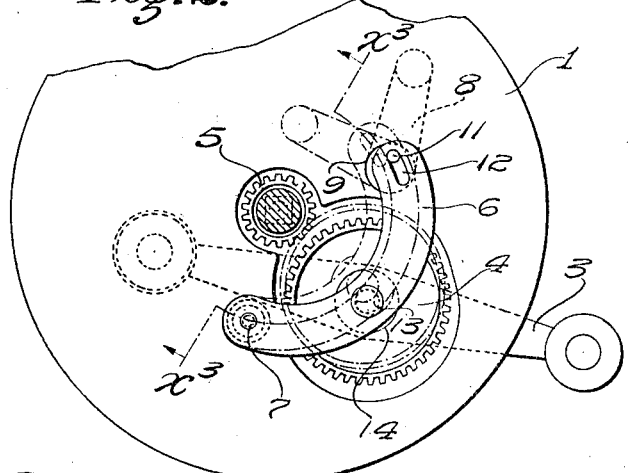
Figure 3:
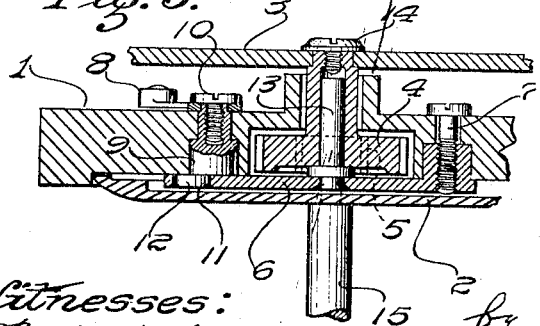

Figure 1 is a view of a form of reel embodying the invention. Fig. 2 is a view looking from the inside of the reel cap shown in Fig. 1. Fig. 3 is a section on line indicated by $x^3$—$x^3$, Figs. 1 and 2. The parts being in position indicated in dotted lines in Fig. 2.

1 designates the reel frame; 2 the spool; 3 the crank or handle; 4 the crank gear; 5 the reel pinion and 6 an arm pivoted to the frame 1 by a pivot 7.

The crank gear 4 is mounted on the pivot arm 6 and said arm is operated by a lever 8, which is journaled in frame 1 by its shaft 9 which is fixed thereto by a screw 10 and is provided with an eccentric pin 11 that engages in the slot 12 in the end of the arm 6. The lever 8 serves as a catch to hold the arm 6 in appropriate position without the need of any further catch. The pin 11 is eccentric to the shaft 9 so that the gear 4 can be thrown into and out of mesh by simply swinging said lever 8 in one or the other direction.

The orbit of the eccentric pin terminates on opposite sides of the axis of the shaft, so as to hold the arm 6 in one position with the gears fully in mesh, and in another position with the gears fully out of mesh. In practice the user can readily manipulate the lever 8 from one limit to the other and the means moving with said arm 6 to lock the same, as by the part 12, will by positive engagement with the engaging part, as 11, fix the swinging arm in either the meshing or non-meshing position.

When the fisherman desires to cast his line, not shown, he will swing the lever 8 into the dotted position of Fig. 2, thus swinging the arm 6 outward to hold the crank gear 4 out of mesh with pinion 5. Then the reel is perfectly free and the line cast without any interference from the crank. The crank-gear-shaft 13 is carried by the arm 6 instead of being rigidly fixed to the reel frame 1. The crank 3 is detachably secured to the crank gear 4 by cap screw 14. By mounting the crank gear on the pivot arm, as shown, it becomes possible to transform the ordinary reel into a free-casting reel without any considerable expense.

15 is the shaft of the spool on which the reel pinion 5 is fixed.

I claim:—

A reel comprising a spool having a shaft, a gear mounted on said shaft, a swinging arm provided with a slot, a gear mounted on said arm and adapted to mesh with the gear on said shaft, a handle for the second named gear, a second shaft, a crank to turn said second shaft, and an eccentric pin on such shaft working in the slot of the swinging arm to move the arm, said pin having an orbit terminating on opposite sides of the axis of such second shaft so as to hold said arm in one position with the gears fully in mesh and in another position with the gears fully out of mesh.

In testimony whereof, I have hereunto set my hand at Los Angeles, California this 20th day of March 1906.

HARRY SLOTTERBECK.

In presence of—
JAMES R. TOWNSEND,
JULIA TOWNSEND.